Feb. 16, 1965  V. DUQUESNE  3,169,569
DEVICE FOR AXIALLY FIXING A COLUMN UPON DISC WHEELS
Filed March 4, 1963
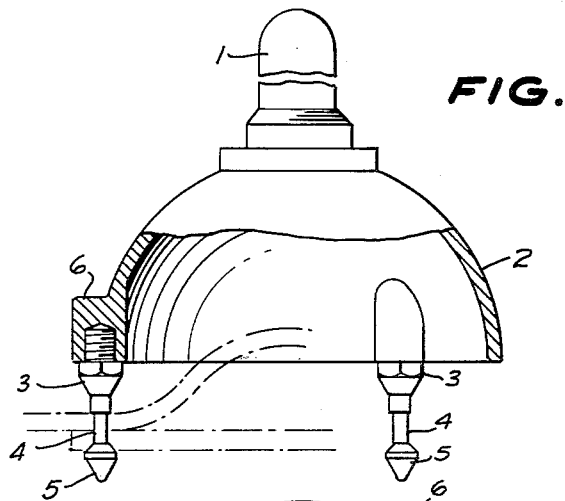
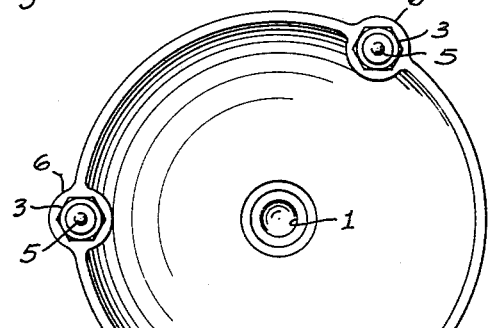
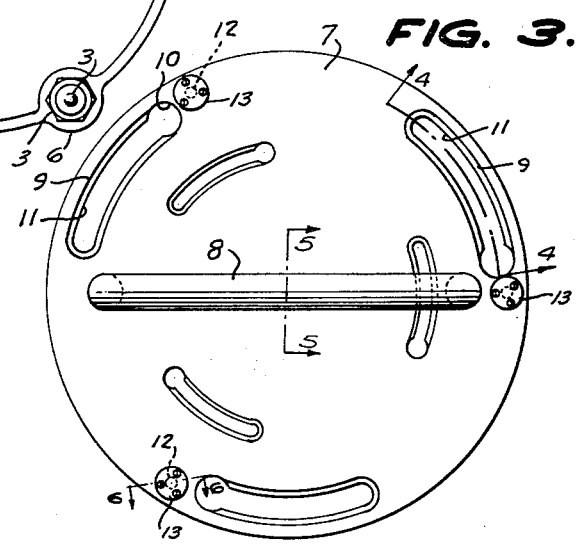
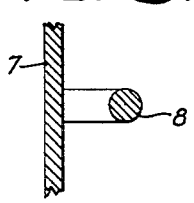
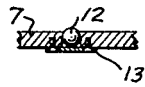
INVENTOR.
VICTOR DUQUESNE,
BY
Linton and Linton
ATTORNEYS.

3,169,569
DEVICE FOR AXIALLY FIXING A COLUMN UPON DISC WHEELS
Victor Duquesne, 42–44 Rue Quellin, Antwerp, Belgium
Filed Mar. 4, 1963, Ser. No. 262,681
3 Claims. (Cl. 157—1.1)

The present invention has for object a device for mounting an axially extending column upon disc wheels of motor vehicles, specially upon disc wheels having only bolt holes arranged equidistant apart around the center of the wheel disc, the column being provided for mounting tools used for mounting or removing tires.

According to the invention, the device comprises a shaft, a bell-shaped member having its convex side fixed at the end of said shaft and having its circular edge in a plane at right angles to the axis of said shaft, axially projecting stud bolts at the edge of said bell-shaped member, said stud bolts having an intermediate shank portion of smaller diameter ending in a bevel edge towards the end of the stud and forming an abutment shoulder at the opposite side, the bolt studs being located to register with the holes of the wheel disc and adapted to traverse said holes and U-shaped steadying locking means having a sloping bottom portion with an opening giving passage for the stud bolts and outwardly directed edges, said locking means cooperating with the bevel edges of said stud bolts for locking the wheel disc between said bevel edges and the abutment shoulders of the stud bolts.

A form of embodiment of the object of the invention will be described by way of example with reference to the accompanying drawing.

FIGURE 1 is an elevational view partly in section showing the column shaft with its bell-shaped member and one of its stud bolts.

FIGURE 2 is a plan view of the underside of the device of FIGURE 1.

FIGURE 3 is a plan view of a disc provided with the steadying locking means for fixing the member of FIGURES 1 and 2 upon a wheel disc.

FIGURE 4 is a median section of one of the button-hole-shaped locking means of the disc of FIGURE 3.

FIGURE 5 is a detail view in section showing a manipulation handle forming part with the disc of FIGURE 3.

FIGURE 6 illustrates in section a detail member controlling the friction coefficient between the disc of FIGURE 3 and the wheel disc, such control member being at least three in number upon a disc.

And FIG. 7 is a cross-sectional view taken on line 7—7 of FIG. 4.

With reference to FIGURES 1 and 2, the device according to the invention comprises a shaft 1 intended to support the tools used for mounting or removing tires from motor vehicle wheels and a bell-shaped member 2 of which the free edge is in a plane at right angles to the shaft 1 axially projecting from the convex side of the bell-shaped member 2. The bell-shaped member 2 bears three profiled stud bolts 3 projecting from its edge and the shank of the bolts have a portion of smaller diameter 4, leaving at the end a bevel edged head 5. The stud bolts 3–4–5 are screwed in embossings 6 at the edge of the bell member 2.

The stud bolts 3–4–5 are arranged to traverse the holes of a wheel disc a, said holes being arranged apart at equal distances from the center of the wheel disc. A steadying and locking disc 7 is applied against the side opposite to that against which the bell member 2 is placed.

The disc 7, which is provided with a manipulating handle 8, comprises three locking slots 9 in the shape of button-holes in arcs concentric to the centre of the disc 7. Said curved slots have an inlet opening 10 affording passage for the stud 3–4–5 and the curved portion is dimensioned to the narrowed part of the stud and presents a sloping bottom 11 and outwardly directed end edges 9. The sloping elements 9–11 cooperate with the bevel edge of the bolt head 5 for locking the wheel disc $a$ in steadied contact with the bell-shaped part 2.

The disc 7 will be provided in at least three points $x$ with a ball 12 held in a hole of the disc by a strip 13 so as to slightly project from the face of the disc 7 and contact with the wheel disc, said ball 12 being held by a light hammering of the material of disc 7 and freely rotating within the hole of this disc. Said balls 12 control the coefficient of friction between the disc 7 and the wheel disc, specially during the operation of unlocking the device.

The use of the steadying and locking disc 7 for fixing the bell-shaped member 2 upon a wheel disc $a$ is simple and efficient. The member 2 is placed upon the wheel disc with the stud bolts 3–4–5 traversing the holes of the wheel disc; the disc 7 is posed against the opposite face of the wheel disc, said stud bolts traversing the inlets 10 of the button-hole shaped parts; a partial turn of the disc 7 given by means of the handle 8 in the direction of the rear end of the sloping bottom 11 will cause the chamfered edges of the button-holes 9 to react against the bevel edged heads of the stud bolts by tractive effort so as to fix the bell-shaped member with its shaft 1 rigidly within the axis of the wheel disc.

The unlocking of the device is obvious per se and eased by the balls 12.

As shown in FIGURE 3, the disc 7 may have a plurality of concentric rows of button-hole shaped parts 9–10–11, so that the disc may be used with wheels of which the disc holes are at different radial positions from the center of the wheel disc, the same disc 7 thus cooperating with bell-shaped members 2 of different size.

I claim:

1. A device for mounting an axially extending tool mounting column upon disc wheels having only bolt holes arranged equidistant apart around the center of the wheel disc, comprising a shaft, a bell-shaped member having its convex side axially fixed at the end of said shaft and having its circular edge in a plane at right angles to the axis of said shaft, axially projecting stud bolts at the edge of said bell-shaped member, said stud bolts having a shank portion of smaller diameter ending in a bevel edge towards the outer end of the studs and forming an abutment shoulder at the opposite side, the bolt studs being located to register with the holes of the wheel disc and adapted to traverse said holes and U-shaped steadying locking means having a sloping bottom portion with an opening giving passage for said stud bolts and outwardly directed edges, said locking means cooperating with the bevel edges of said stud bolts for locking the wheel disc between these bevel edges and the abutment shoulders of the stud bolts.

2. A device as per claim 1, in which the steadying locking means are formed within a disc and shaped as curved button-holes having an inlet opening affording passage to the stud bolts, said button-hole shaped parts having a sloping bottom portion and outwardly directed bevel edges.

3. A device as per claim 1 in which the steadying locking means are formed within a disc and shaped as curved button-holes having an inlet opening for the passage of the stud bolts, and means for controlling the friction coefficient between the said disc and the wheel disc, such control means comprising balls located freely rotating within the disc and slightly projecting from said disc to contact the adjacent face of the wheel disc.

References Cited in the file of this patent
UNITED STATES PATENTS

| | | |
|---|---|---|
| 1,556,941 | Liddell | Oct. 13, 1925 |
| 2,848,279 | Parker | Aug. 19, 1958 |